(12) United States Patent
King

(10) Patent No.: US 7,652,251 B1
(45) Date of Patent: Jan. 26, 2010

(54) REGISTRATION METHODS FOR FUSING CORRESPONDING INFRARED AND VISIBLE LIGHT IMAGES

(75) Inventor: Stephen R. King, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 12/272,465

(22) Filed: Nov. 17, 2008

(51) Int. Cl.
*H01J 31/49* (2006.01)
(52) U.S. Cl. .................................... 250/332
(58) Field of Classification Search .............. 250/332
See application file for complete search history.

(56) References Cited

U.S. PATENT DOCUMENTS 5,461,442 A 10/1995 Ohshita
5,765,056 A 6/1998 Ohtake et al.
2006/0249679 A1 11/2006 Johnson et al.

OTHER PUBLICATIONS

Zhang et al., "Pixel by Pixel VIS/NIS and LIR sensor Fusion System,", 2003, Proceedings of SPIE, vol. 4820, pp. 535-549.*
Johnson et al., "Commercial Fusion Camera," 2006, Proceedings of SPIE, vol. 6205, pp. 62050H-1-620500H-9.*

* cited by examiner

*Primary Examiner*—David P Porta
*Assistant Examiner*—Kiho Kim
(74) *Attorney, Agent, or Firm*—Fredrikson & Byron, P.A.

(57) ABSTRACT

A thermal imaging apparatus includes an infrared camera module, aligned along a first axis, and a visible light camera module, aligned along a second axis. The apparatus employs a magnification correction factor, along with parallax correction, to register an infrared image, obtained by the infrared module, with a visible light image, obtained by the infrared module.

16 Claims, 4 Drawing Sheets

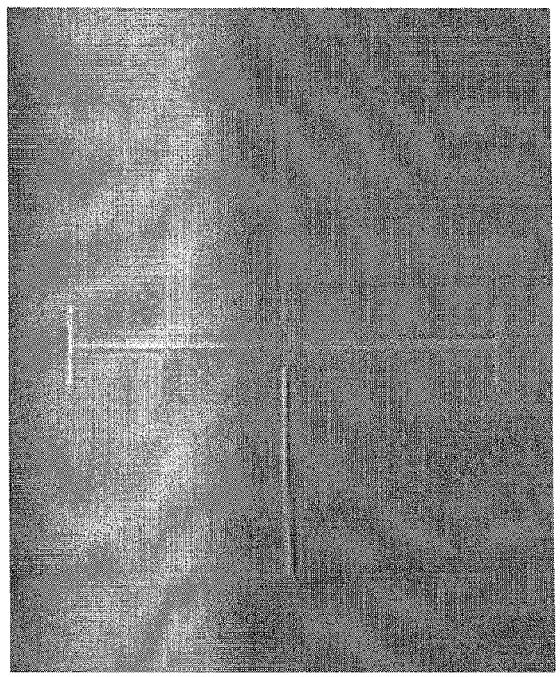
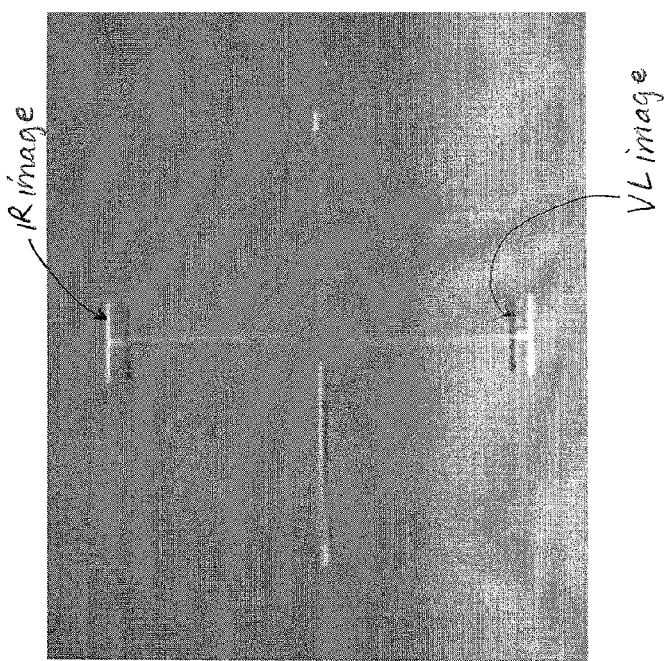
FIGURE 3A
FIGURE 3B

REGISTRATION METHODS FOR FUSING CORRESPONDING INFRARED AND VISIBLE LIGHT IMAGES

TECHNICAL FIELD

The present invention pertains to thermal imaging, and more particularly to methods for fusing a thermal image, captured by an infrared camera module of a imaging apparatus, with a corresponding visible light image, captured by a visible light camera module of the imaging apparatus.

BACKGROUND

Thermal imaging apparatus which include both infrared (IR) and visible light (VL) camera modules are known in the art. These apparatus allow an operator to capture both an IR image of an object, or scene, of interest and a corresponding VL image, as a control image on which the IR image may be overlaid. These apparatus often include a display screen and the appropriate electronics to map both the IR and VL images to the screen for a concurrent, or fused, display of the images thereon. Because the VL camera module is typically mounted alongside the IR camera module, in these apparatus, such that their respective optical axes are offset from one another, and extend approximately parallel to one another, the parallax phenomena is accounted for when registering one of the images with the other of the images to create a fused image.

Embodiments of such an apparatus, in which optical axes of the IR and VL camera modules are held in fixed relation to one another so that the parallax error is corrected for electronically, via pre-programmed software, when fusing the two images, are described in co-pending and commonly-assigned U.S. patent application 2006/0289772, which is hereby incorporated by reference in its entirety. One example of this type of apparatus is the IR FlexCam®, available from Infrared Solutions, Inc.—a Fluke Company. Although the parallax correction employed by this apparatus provides acceptable fusion of the two images in many situations, there are special situations in which an additional correction is desirable to better register the IR image with the VL image and thereby provide a higher quality fusion.

BRIEF DESCRIPTION OF THE DRAWINGS

The following drawings are illustrative of particular embodiments of the invention, and are not intended to limit the scope of the invention. The drawings are not to scale (unless so stated) and are intended for use in conjunction with the explanations in the following detailed description. Embodiments of the disclosure will hereinafter be described in conjunction with the appended drawings, wherein like numerals denote like elements.

FIG. 3A is an exemplary fused image that illustrates a need for additional correction, which may be accomplished by methods of the present invention.

FIG. 3B is an exemplary fused image that illustrates additional correction, which may be provided by methods of the present invention.

DETAILED DESCRIPTION

The following detailed description is exemplary in nature and is not intended to limit the scope, applicability, or configuration of the invention in any way. Rather, the following description provides practical illustrations for implementing exemplary embodiments. Utilizing the teaching provided herein, those skilled in the art will recognize that many of the examples have suitable alternatives that can be utilized.

Figure 1:
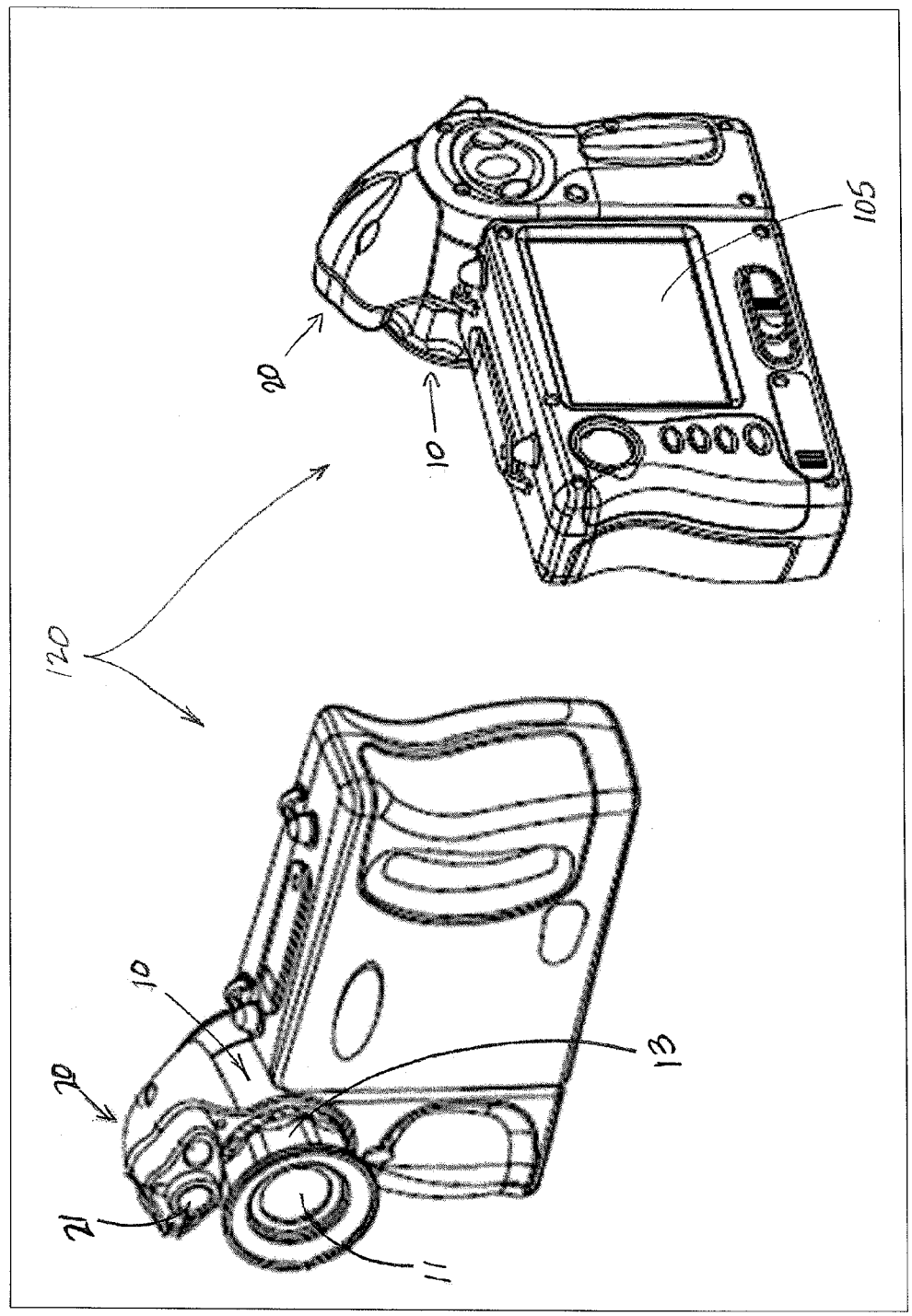
FIG. 1 shows front and back perspective views of a thermal imaging apparatus that may employ methods of the present invention.
Figure 2:
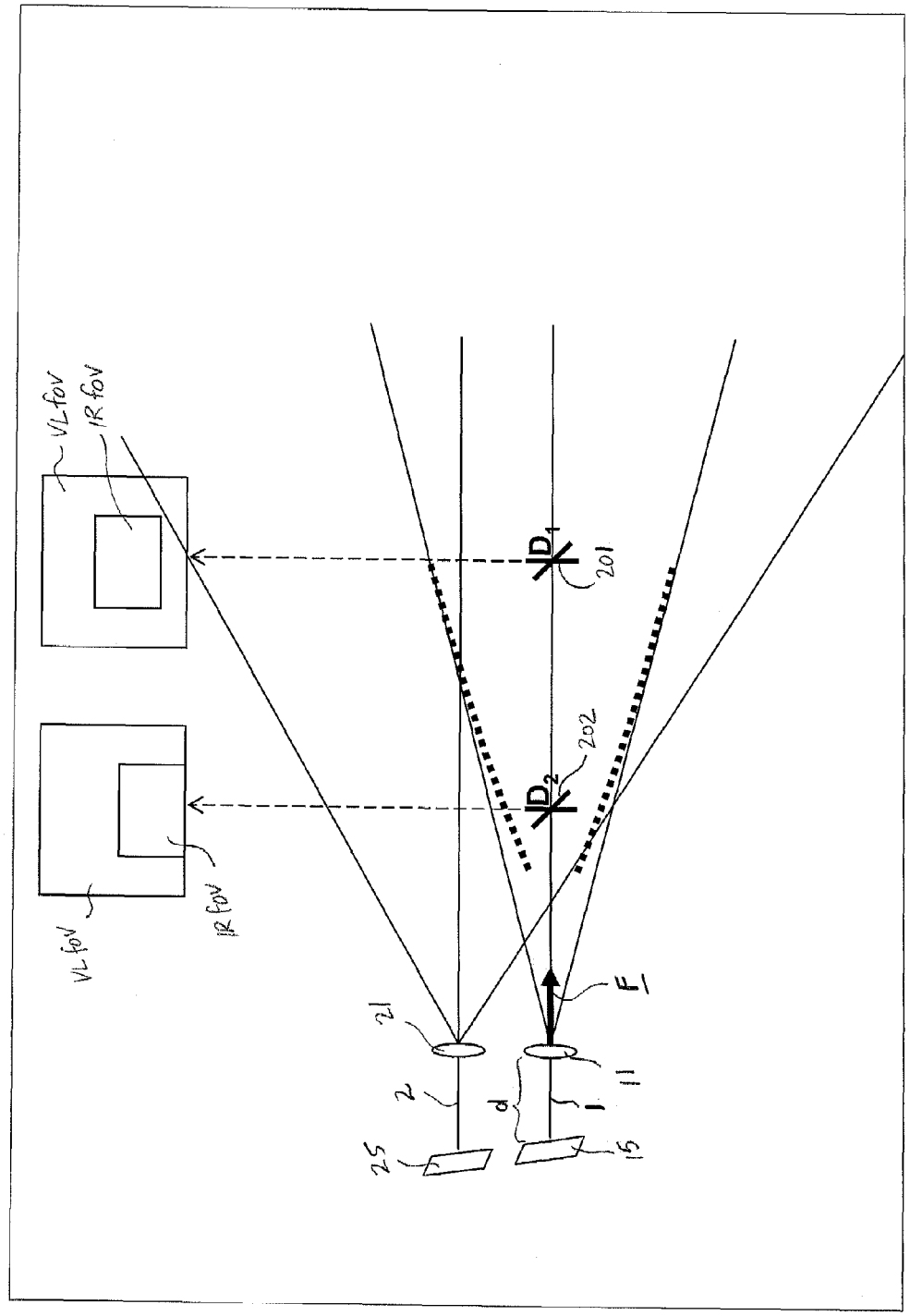
FIG. 2 is a schematic illustrating the parallax phenomena, for targets at two distances, which may be corrected for by methods of the present invention.

FIG. 1 shows front and back perspective views of a thermal imaging apparatus 120 that may employ methods of the present invention. FIG. 1 illustrates apparatus 120 including an infrared (IR) camera module 10, a visible light (VL) camera module 20 and a display screen 105 on which IR images, obtained by IR module 10 and VL images, obtained by VL module 20, may be displayed, either independently, or together as a fused image. FIG. 1 further illustrates IR module 10 including a lens 11 and a focusing ring 13 for lens 11, and VL module including a lens 21. Although not shown in FIG. 1, it should be appreciated that IR module 10 further includes an IR sensor, aligned along a first axis 1 (FIG. 2) with lens 11, and that VL module includes a VL sensor, aligned along a second axis 2 (FIG. 2) with lens 21, which second axis 2 is offset from first axis 1; according to some embodiments of the present invention, first axis 1 is approximately parallel with second axis 2, but the scope of the invention is not so limited. Each of the IR and VL sensors 15, 25 include a corresponding field of view (fov), which are each defined by a focal plane array of pixels, and which intersect with one another over a range of useful focus distances, for example, as illustrated in FIG. 2. According to some embodiments, the number of pixels defining the IR fov is less than the number of pixels defining the VL fov, for example, in an exemplary embodiment, the array of IR pixels is a 160×120 array and the array of VL pixels is a 1280×1024 array.

The general operation of an apparatus, which is similar to apparatus 120 is described in the aforementioned, co-pending and commonly assigned application '772. Like that described in the '772 reference, apparatus 120 includes electronics contained in the body thereof, which may be of the digital programmable type, known in the art, wherein a pre-programmed microprocessor controls the acquisition and blending of image data collected by IR module 10 and VL module 20, in order to enable the display of a fused image upon display screen 105. The microprocessor corrects for parallax, in order to align, or register, the data set making up the IR image with the data set making up the VL image, when blending the data. According to embodiments of the present invention, the microprocessor is further programmed to apply a magnification correction factor in conjunction with the parallax correction, as will be described in greater detail below.

FIG. 2 is a schematic illustrating the parallax phenomena, for targets, or objects 201, 202, which are located at two distances $D_1$, $D_2$, respectively, from IR lens 11. It should be noted that, according to the illustrated embodiment, VL module 20 remains in a fixed focus at all the desirable distances for imaging. FIG. 2 illustrates how the fixed locations of axes 1 and 2, which correspond to lenses 11, 21 and respective focal plane arrays 15, 25, respectively, contribute to a parallax error, which is generally shown, schematically, at the end of the vertical dashed-line arrows, by the locations of the VL fov and the IR fov at each distance $D_1$, $D_2$. Those skilled in the art will appreciate that, a size, i.e. a height and a width of the IR fov, should be scaled, or translated from IR pixels to VL pixels, or visa versa, before the parallax error is corrected, in order to match the size and location of the IR fov within the VL fov for a fused image, since the position of one of the centers in the other fov is dependent upon the scaled, or translated, size of the one to the other. With reference to FIG. 2, it can be seen that this alignment, or registration, will depend upon a distance between IR lens 11 and objects 201, 202. A lens position sensor, for example, a hall effect sensor attached to focus ring 13, like that described in the aforementioned '772 reference, may be incorporated to measure a distance of lens 11 from focal plane array 15; each measured distance may have been previously calibrated to a focus distance for lens 11 so that a distance between lens 11 and an object on which lens 11 is focused can be determined from the measured distance and then be input to the microprocessor for the parallax correction.

FIG. 2 further illustrates, with a bold dashed line, a non-linear reduction in the size of the IR fov as lens 11 is moved, per arrow F, to focus on the closer object 202. Within this non-linear zone, in order to avoid an error in the parallax correction, methods of the present invention account for the distance between IR lens 11 and an object of interest, for example, distance $D_2$ for object 202. According to these methods, a magnification correction factor is applied to the scaling, in order to account for the change in IR image magnification at the closer focus distance. In FIG. 3A a first fused image of a target is shown in order to illustrate the scaling of an IR image that has not been corrected with the magnification correction factor; while in FIG. 3B a second fused image of the same target is shown in order to illustrate the application of the magnification correction factor. The target of FIGS. 3A-B is composed of a plate including slits in the form of a cross; the target is placed in front of a heat source so that a higher temperature is detected at the location of the slits, by IR camera module 10. In practice, objects of a relatively small size, such as circuit boards, require that a focused IR lens 11 be located fairly closely thereto in order to capture more details, for example, to resolve, or distinguish between, individual components of the circuit board.

Figure 4:
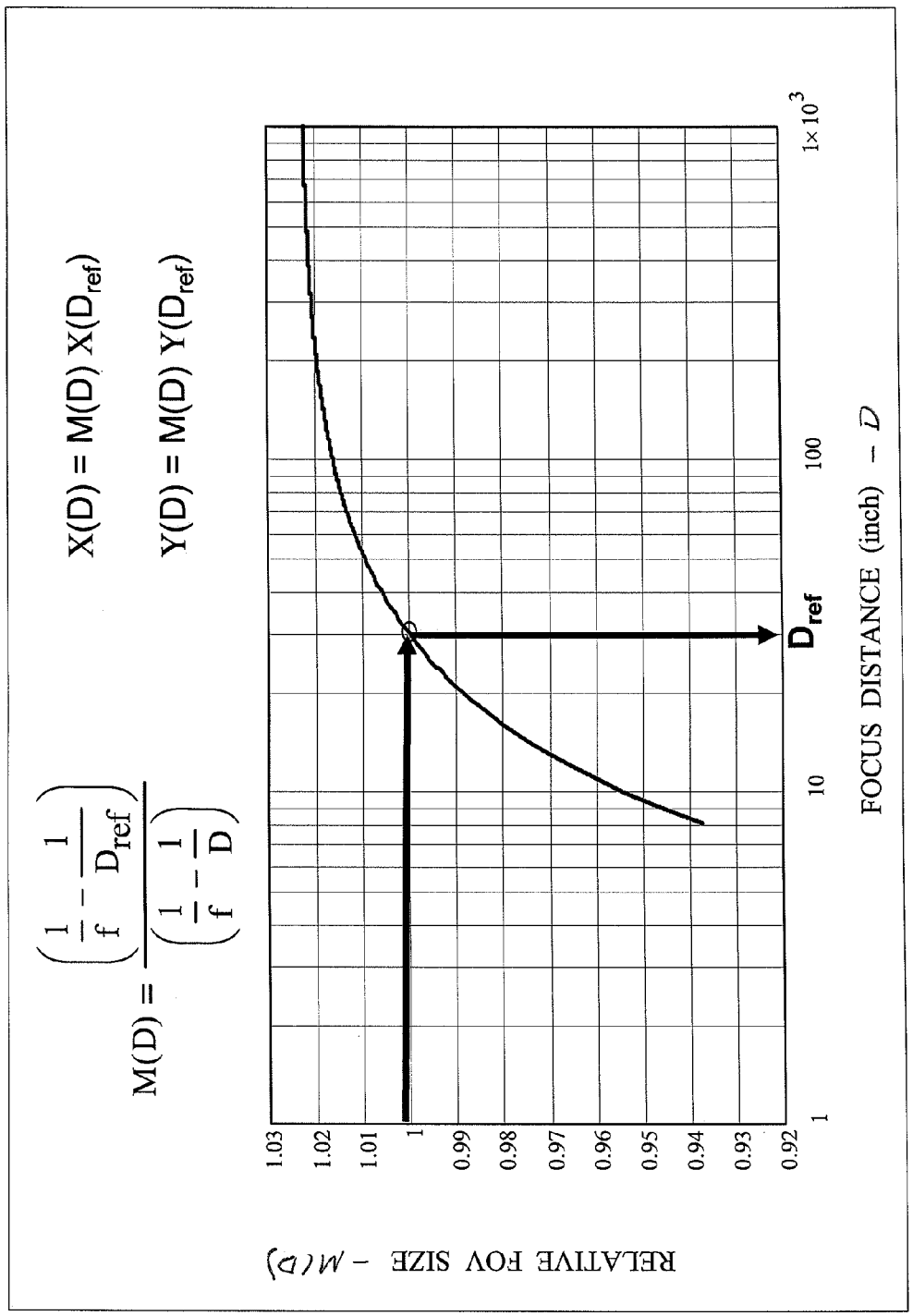
FIG. 4 is a chart defining an exemplary relationship between a relative size of an IR field of view, or a magnification correction factor, and focus distance, which may be employed by methods of the present invention.

FIG. 4 is a chart defining an exemplary relationship between a relative size of an IR field of view, or a magnification correction factor M(D), and focus distance D, which may be employed by methods of the present invention. The illustrated relationship is for an IR camera module having a focal length f of approximately ¾ inch. FIG. 4 further illustrates the calculation of a corrected width X(D) and a corrected height Y(D), of an IR fov at a distance D, by multiplying a reference width $X(D_{ref})$ and a reference height $Y(D_{ref})$, respectively, by the magnification correction factor M(D). It should be noted that $X(D_{ref})$ and $Y(D_{ref})$ are the height and width of the IR fov, in terms of VL pixels in the VL fov, determined, for example, during calibration, with a target located at a reference focus distance $D_{ref}$ (approximately 30 inches in FIG. 4), wherein M(D) is equal to one. With further reference to FIG. 4, if focus distance D is approximately 10 inches, M(D) is approximately 0.955.

Once M(D) is determined by the microprocessor of apparatus 120, based upon the focus distance input and the illustrated relationship, and once coordinates ($x_c$, $y_c$), in terms of visible pixels, for a center of the IR fov, within the array of VL pixels of the VL fov are be calculated, by the microprocessor, the corrected width X(D) and the corrected height Y(D) of the IR fov, in VL pixels, can be calculated, in order to register the infrared image of the object with the visible light image of the object. According to some embodiments, the microprocessor is pre-programmed to compare all inputs of focus distance D to a predetermined distance threshold, for example, equal to $D_{ref}$, and then, only if the input focus distance is less than the predetermined threshold, to apply the magnification correction factor.

According to some embodiments of the present invention, apparatus 120 includes a memory, or data base, in which a plurality of magnification correction factors M(D), corresponding to a plurality of focus distances D for lens 11, are stored. This stored information may be configured as a lookup table, which is referenced by the microprocessor of apparatus 120, given the input of focus distance D, for example, from the lens position sensor, as previously described. The microprocessor may determine the magnification correction factor from within a range of values defined by the plurality of stored factors, for example, by interpolation, based upon the focus distance input. According to some alternate embodiments, the microprocessor is adapted to calculate M(D).

In the foregoing detailed description, the invention has been described with reference to specific embodiments. However, it may be appreciated that various modifications and changes can be made without departing from the scope of the invention as set forth in the appended claims.

I claim:

1. A method employed by a thermal imaging apparatus, the method for registering infrared images with visible light images, each of the infrared images being captured, by an infrared sensor of the imaging apparatus, in a corresponding infrared field of view, which is defined by an array of infrared pixels, the infrared sensor being aligned, along a first axis, with a first lens of the imaging apparatus, each of the corresponding visible light images being captured, by a visible light sensor of the imaging apparatus, in a corresponding visible field of view, which is defined by an array of visible pixels, the visible light sensor being aligned, along a second axis, with a second lens of the imaging apparatus, and the method comprising:

capturing an infrared image of the object in an infrared field of view, the first lens of the imaging apparatus having been focused on the object which object is located at a distance from the first lens;

capturing a visible light image of the object, at the distance, in a visible field of view;

determining a reference height and a reference width of the infrared field of view, the reference height and the reference width being defined in terms of visible pixels in the visible field of view;

determining the distance from the focused first lens to the object;

multiplying each of the reference height and the reference width of the infrared field of view by a magnification correction factor in order to obtain a corrected height and a corrected width of the infrared field of view, the magnification correction factor being a function of a focal length of the first lens, the determined distance, and a reference distance, at which reference distance the magnification correction factor is equal to one; and calculating coordinates, in terms of visible pixels, for a center of the infrared field of view within the array of visible pixels of the visible field of view, in order to register the infrared image of the object with the visible light image of the object.

2. The method of claim 1, wherein determining the distance from the focused first lens to the object comprises sensing a position of the focused first lens with respect to the infrared focal plane array.

3. The method of claim 2, wherein sensing the position of the focused first lens is accomplished via a hall sensor attached to a focusing ring of the first lens of the apparatus.

4. The method of claim 1, further comprising:
selecting the magnification correction factor from within a range of values;
wherein the range of values is defined by a plurality of magnification correction factors that have been calculated for a corresponding plurality of distances and stored in a data base of the apparatus; and
the determined distance is within the range of the plurality of distances.

5. The method of claim 1, further comprising calculating the magnification correction factor following determining the distance.

6. A thermal imaging apparatus comprising:
a first lens;
an infrared sensor including a corresponding infrared field of view, which is defined by an array of infrared pixels, the infrared sensor being aligned, along a first axis, with the first lens;
a second lens;
a visible light sensor including a corresponding visible field of view, which is defined by an array of visible pixels, the visible light sensor being aligned, along a second axis, with the second lens, the second axis being offset from, and extending approximately parallel with the first axis;
a display screen adapted to display both an infrared image, transferred from the infrared sensor, and a visible light image transferred from the visible light sensor;
a microprocessor programmed to register the infrared image with the visible light image on the display by receiving an input of a distance from the first lens to an object on which the first lens is focused, and by applying a magnification correction factor to a reference height and a reference width of the infrared field of view, the reference height and the reference width being defined by visible pixels in the visible field of view, and the magnification correction factor corresponding to the input of the distance.

7. The apparatus of claim 6, further comprising:
a focusing ring for the first lens; and
a hall sensor attached to the focusing ring for measuring a position of the first lens with respect to the infrared focal plane array;
wherein the hall sensor provides the input of the distance based upon the measured position of the first lens.

8. The apparatus of claim 6, further comprising:
a data base of a plurality of magnification correction factors, the plurality of factors having been calculated for a corresponding plurality of focus distances for the first lens; and
wherein the microprocessor is further programmed to select the magnification correction factor from within a range of values defined by the plurality of factors, based upon the distance input.

9. The apparatus of claim 6, wherein the microprocessor is further programmed to calculate the magnification correction factor based upon the distance input.

10. The apparatus of claim 6, wherein:
the microprocessor is further programmed to compare the distance input to a pre-programmed distance threshold; and
the microprocessor applies the magnification correction factor only when the distance input is less than the pre-programmed distance threshold.

11. A method employed by a thermal imaging apparatus, the method for registering infrared images with visible light images, each of the infrared images being captured, by an infrared sensor of the imaging apparatus, in a corresponding infrared field of view, which is defined by an array of infrared pixels, the infrared sensor being aligned, along a first axis, with a first lens of the imaging apparatus, each of the corresponding visible light images being captured, by a visible light sensor of the imaging apparatus, in a corresponding visible field of view, which is defined by an array of visible pixels, the visible light sensor being aligned, along a second axis, with a second lens of the imaging apparatus, and the method comprising:
capturing an infrared image of the object, at the distance, in an infrared field of view, the first lens of the imaging apparatus having been focused on the object, which object is located at a distance from the first lens;
capturing a visible light image of the object, at the distance, in a visible field of view;
determining the distance from the focused first lens to the first object;
comparing the determined distance with a predetermined threshold distance;
multiplying each of a reference height and a reference width of the infrared field of view by a magnification correction factor, if the determined distance is less than the predetermined threshold distance, in order to obtain a corrected height and a corrected width of the infrared field of view, the magnification correction factor being a function of a focal length of the first lens, the determined distance, and a reference distance, at which reference distance the magnification correction factor is equal to one; and
calculating coordinates, in terms of visible pixels, for a center of the infrared field of view within the array of visible pixels of the visible field of view, in order to register the infrared image of the object with the visible light image of the object.

12. The method of claim 11, wherein the predetermined threshold distance is approximately equal to the reference distance.

13. The method of claim 11, wherein determining the distance from the focused first lens to the object comprises sensing a position of the focused first lens with respect to the infrared focal plane array.

14. The method of claim 13, wherein sensing the position of the focused first lens is accomplished via a hall sensor attached to a focusing ring of the first lens of the apparatus.

15. The method of claim 11, further comprising:
selecting the magnification correction factor from within a range of values;
wherein the range of values is defined by a plurality of magnification correction factors that have been calculated for a corresponding plurality of distances and stored in a data base of the apparatus; and
the determined distance is within the range of the plurality of distances.

16. The method of claim 11, further comprising calculating the magnification correction factor following determining the distance.

* * * * *